(12) United States Patent
Shuster

(10) Patent No.: US 9,560,003 B2
(45) Date of Patent: Jan. 31, 2017

(54) ERRONEOUS ADDRESSING PREVENTION FOR ELECTRONIC MESSAGING

(76) Inventor: Gary Stephen Shuster, Fresno, CA (US)

( * ) Notice: Subject to any disclaimer, the term of this patent is extended or adjusted under 35 U.S.C. 154(b) by 926 days.

(21) Appl. No.: 12/372,647

(22) Filed: Feb. 17, 2009

(65) Prior Publication Data

US 2009/0210504 A1    Aug. 20, 2009

Related U.S. Application Data

(60) Provisional application No. 61/028,846, filed on Feb. 14, 2008.

(51) Int. Cl.
*G06F 15/16* (2006.01)
*H04L 12/58* (2006.01)

(52) U.S. Cl.
CPC .............. *H04L 51/28* (2013.01); *H04L 51/30* (2013.01)

(58) Field of Classification Search
USPC .................................................. 709/204–207
See application file for complete search history.

(56) References Cited

U.S. PATENT DOCUMENTS

| | | | |
|---|---|---|---|
| 5,283,856 A | 2/1994 | Gross et al. | |
| 6,460,074 B1 * | 10/2002 | Fishkin | 709/206 |
| 6,654,779 B1 * | 11/2003 | Tsuei | 718/101 |
| 6,671,718 B1 * | 12/2003 | Meister et al. | 709/206 |
| 7,072,942 B1 * | 7/2006 | Maller | 709/206 |
| 7,127,741 B2 | 10/2006 | Bandini et al. | |
| 7,290,033 B1 | 10/2007 | Goldman et al. | |
| 2002/0065891 A1 * | 5/2002 | Malik | 709/206 |
| 2002/0133556 A1 * | 9/2002 | Milovanovic | 709/206 |
| 2004/0103162 A1 * | 5/2004 | Meister et al. | 709/206 |
| 2004/0128552 A1 * | 7/2004 | Toomey | 713/201 |
| 2005/0188031 A1 * | 8/2005 | Zandt | 709/206 |
| 2005/0188330 A1 | 8/2005 | Griffin | |
| 2005/0223064 A1 | 10/2005 | Salerno et al. | |
| 2005/0278430 A1 * | 12/2005 | Cato | 709/206 |
| 2007/0005708 A1 | 1/2007 | Juliano | |
| 2007/0011252 A1 | 1/2007 | Taylor | |
| 2007/0011253 A1 | 1/2007 | Taylor | |
| 2007/0067394 A1 | 3/2007 | Adams et al. | |
| 2007/0106731 A1 * | 5/2007 | Bhakta et al. | 709/206 |
| 2007/0156618 A1 | 7/2007 | Meurs | |
| 2007/0214219 A1 * | 9/2007 | Chen | 709/206 |
| 2007/0226300 A1 | 9/2007 | Smith et al. | |
| 2008/0037733 A1 * | 2/2008 | Chen et al. | 379/88.22 |
| 2008/0076472 A1 | 3/2008 | Hyatt | |

* cited by examiner

*Primary Examiner* — Hua Fan
(74) *Attorney, Agent, or Firm* — Sherrie Flynn; Coleman & Horowitt LLP

(57) ABSTRACT

An electronic mail client includes features for preventing addressing errors in electronic messaging such as those caused by predictive text features. A messaging client tracks addressing parameters including the length of time since each previous addressee has been messaged, the quantity of times selected addressees have been co-addressees on messages, if any, whether the addressees are designated as sensitive and whether the messages contain sensitive subject matter. If a high risk of addressing error is determined, the client delays transmission of the message to permit the user to review the message recipient addresses and correct any erroneous addressees.

13 Claims, 3 Drawing Sheets

ERRONEOUS ADDRESSING PREVENTION FOR ELECTRONIC MESSAGING

CROSS-REFERENCE TO RELATED APPLICATION

This application claims priority pursuant to 35 U.S.C. §119(e) to U.S. provisional application Ser. No. 61/028,846, filed Feb. 14, 2008, which application is specifically incorporated herein, in its entirety, by reference.

BACKGROUND

1. Field

The present disclosure relates to an apparatus for preventing transmitting of electronic mail or messages to erroneous-selected addressees.

2. Description of Related Art

Many programs, both web-based and locally executed, and across platforms such as personal computers, PDAs and cellular phones, use predictive text to reduce the number of keystrokes used to identify the addressee of a communication, Some modalities use voice recognition or otherwise avoid the use of finger-driven input at all. Predictive text systems generally store lists of past addressees in a database or other memory structure, and predicted addressees are selected from past addressees on the list. In the alternative, or in addition, predictive entries may be selected from addressees stored in an electronic address book or the like belonging the prospective sender of the communication. Notwithstanding the advantages of predictive text, it is subject to certain disadvantages. With the decreased level of input required to identify a addressee comes an increased risk of the predictive text identifying the wrong addressee. If the error is not noticed by the human operator addressing the message, the message may be transmitted to the wrong recipient. Therefore, for users of predictive text features, a message can be all too easily sent to the wrong recipient, resulting in disrupted communications, confusion, embarrassment, breach of confidentiality, or other adverse consequences.

For example, a person who has two contacts in his address book with the same first name, "John," may try to email "John Smith." When the person types "jo," the predictive input system may present him with two choices: "John Adams" and "John Smith." A simple erroneous flick of the finger selects "John Adams" instead of "John Smith," which if not noticed before the message is sent, may result the email going to the wrong recipient.

Other email addressing functions may also lead to incorrect addressees being added to a message. For example, email clients generally provide a "reply all" functions that automatically addresses an outgoing message with all addresses listed as recipients of an incoming message, plus the sender of the incoming message. The user making use of the "reply all" feature may have intended to use a "reply" to sender only function, or may not notice that one or more of the addressees added by the "reply all" function should not receive the reply. Either way, the reply message may be transmitted to an unintended addressee. Other addressing errors may be caused by selecting the wrong message to reply to or just unintentionally selecting the wrong addressee for some other reason.

It would be desirable, therefore, to preserve the function of predictive text systems in electronic message addressing, and other addressing features, while reducing or eliminating the risk of erroneous addressee selection that presently arises from the use of such systems. There is no obvious solution to this problem, however, because the speed and convenience that is the purpose of predictive texting and other features is contrary to the purpose of increasing accuracy and reducing risk or error. It is difficult to conceive of a solution that effectively satisfies these diverse and contrary objectives.

SUMMARY

An electronic mail or messaging client may be configured, using suitable client-side software, firmware, and/or hardware, to determine a level of risk for each addressee identified prior to transmission of an electronic message. If a determined level of risk for an addressee exceeds a predetermined threshold, the client outputs an alert, such as, for example, a pop-up display message, to alert the sender. The messaging client may require the sender to confirm that the addressee is correct before transmitting the message.

The electronic mail or messaging client may comprise a processor operatively associated with random-access memory for holding processor instructions and computational results and input data. The processor may also be in communication with a storage device, including a tangible computer-readable medium, for storing software and data for use in operating the processor. Other components of the client may include a network interface enabling the processor to communicate with an electronic mail or messaging server; a display screen and/or speaker for providing visible and/or audible output to the user, and an input device, for example, a keyboard, touchscreen, pointing device, and/or microphone for receiving tactile and/or audible input. All of the foregoing components may be housed in housing configured in any suitable form factor. For example, the messaging client may be provided in a portable, hand-held form, such as in a palm-top computer or intelligent mobile phone. In the alternative, the messaging client may be provided in the form of a laptop or desktop computer. The messaging client may thus be equipped to transform tactile or audible input into an interactive display for authoring, addressing, and transmitting an electronic message. Any electronic message prepared using the messaging client may be stored in a computer-readable medium and represents a transformation of the tactile and/or audible input received by the electronic mail client into the form of electronic message data and into audible or visible output representing that data.

Further transformation of the data may occur when the electronic message is transmitted to a recipient mail client. The message may be transferred to and recorded in different storage medium, such as to a storage medium for a mail server, along the transmission path. Header information may be added to the message as one ore more nodes along the transmission path, recording details of the transmission route. Eventually the message may be accessed by a recipient client from a local or remotely located storage device, causing a visual display and/or audio output relaying the message to a recipient. All of these transformations involve changes in tangible objects that in many cases are essential to the function and purpose of the electronic mail or messaging system.

Correct addressing is an essential part of the message transformation sequence. Without consistently correct addressing, the electronic message system, including the messaging client, has no utility or value. To effectively reduce addressing errors introduced by predictive texting, the messaging client should be provided with operating instructions to effectively detect situations signaling a relatively high risk that an incorrect addressee has been identified, without generating alerts when the risk is relatively low. This may be accomplished using a multi-factor analysis of contributing risk factors programmed into the message client or server. The client or server may be programmed to detect the presence or absence of risk factors, and process the factor data using an appropriate algorithm to determine a level of risk. Exemplary risk factors are described below.

For example, one risk factor may be determined from similarity between a selected address and one or more other addresses in the database used for predictive texting. Similarity may be measured using algorithms that compare the characters in address strings, the length of the address strings, and character positions within the strings. Risk may be determined based on a rule, for example, that the likelihood of error increases in proportion to the degree of similarity between a selected address and one or more other addresses in the predictive pool.

Another risk factor may be determined from the relative frequency with which mail has been sent to a selected address in the past. Verifying infrequent addressees may prevent erroneous communication in an electronic mail client. For example, if a particular address has not been a designated address in a message from the mail client within 'n' days (wherein 'n' may be pre-set, may include infinity or may be set by the user), the client may generate and output a confirmation query, which may contain history data. The confirmation query as displayed on an output device connected to the client may read, for example, for a message addressed to John Adams: "You haven't sent an email to John Adams in 193 days, but emailed John Smith just this morning. Have you selected the right recipient?" The client may generate and display an input button or box requesting confirmation of "yes" or "no" in response to the query. In response to receiving "yes" input, the client may transmit the message. In response to receiving "no" input, the client may prevent message transmission to permit the user to correct the message address.

Another risk factor may be determined from analyzing past patterns of addressee groupings. For example, determining and then verifying unusually paired addressees may prevent inadvertent communication in an electronic mail client. If addresssees of a multiple-recipient message have not been emailed together previously (or for a long predetermined time), the messaging client may generate a confirmation message. The user may also be asked for confirmation if the addressees have not been part of a forwarded or replied-to message to which a non-original addressee is added. Such a confirmation message may read, for example: "I notice you are emailing both John Smith and Thomas Jefferson. You have never sent both of those recipients the same message. Do you intend to do this?" In addition, the message may suggest alternatives such as "You have, however, frequently emailed Thomas Jefferson and John Adams together. Do you really intend to send this to John Smith?"

Another risk factor may be determined from analyzing past addressing patterns in relation to the day of the week or holidays. For example, business correspondence may be more frequently prepared on weekdays or non-holidays, while personal correspondence may more frequently occur on weekends or holidays. The client or server may track these associations and alert the sender if an addressee violates a tendency determined from past correspondence. For example, during a weekend the client may generate a message such as "You don't usually send mail to John Adams on a weekend. Are you sure you don't mean to send this message to John Smith?"

Additionally, the messaging client may permit the user to designate "sensitive" recipients or categories of recipients as a way of reducing addressing risk. For example, any addressee identified in an address book as a lawyer may be denoted as sensitive for addressing purposes. The messaging client may be configured to require that any message to an addressee designated as "sensitive" not be sent without confirmation. For example, the client may generate and output a message such as "You are attempting to email attorney Jane Hutz. You have asked that any email to attorneys be confirmed prior to sending. Please confirm that you wish to send this email." Optionally, messages that are replies to emails from the same user may be excepted from the requirement for confirmation, as a replay message is less likely to be addressed incorrectly. Such confirmations may also be set on an enterprise level, requiring all employees of Corporation X to verify before sending to lawyers.

In addition, or in the alternative, the messaging client may also be configured to support designating "sensitive" information or subject areas to prevent unintended communication. In the alternative, or in addition, sensitive terms may be defined by an administrator for system-wide use by multiple clients. For example, any email containing the term "fraud" may be set to require additional confirmation. Such requirement may also be implemented only where other criteria are met. For example, a messaging client may generate a confirmation message such as: "I notice you are emailing attorney Jane Hutz with an email containing the word "fraud." You have asked for confirmation before sending such emails. Please confirm that you intend to do this."

In the alternative, or in addition, the messaging client may be configured to hold emails or messages that satisfy designated risk criteria for a designated period before transmitting. The rule sets that the client uses to determine whether or not a message should be held may be the same or similar to those used to select outgoing messages requiring additional verification. Any email matching those criteria may be held for a specified time prior to sending. For example, any email sent to a governmental agency (or a ".gov" address) may be held for 60 minutes prior to sending. Optionally, the user may be informed of the holding time. The client may be configured to permit the user to change his or her mind during the holding period, and edit or cancel the email prior to its delivery.

A more complete understanding of the apparatus and method for reducing addressing or messaging errors will be afforded to those skilled in the art, as well as a realization of additional advantages and objects thereof, by a consideration of the following detailed description. Reference will be made to the appended sheets of drawings which will first be described briefly.

DETAILED DESCRIPTION

Figure 1:
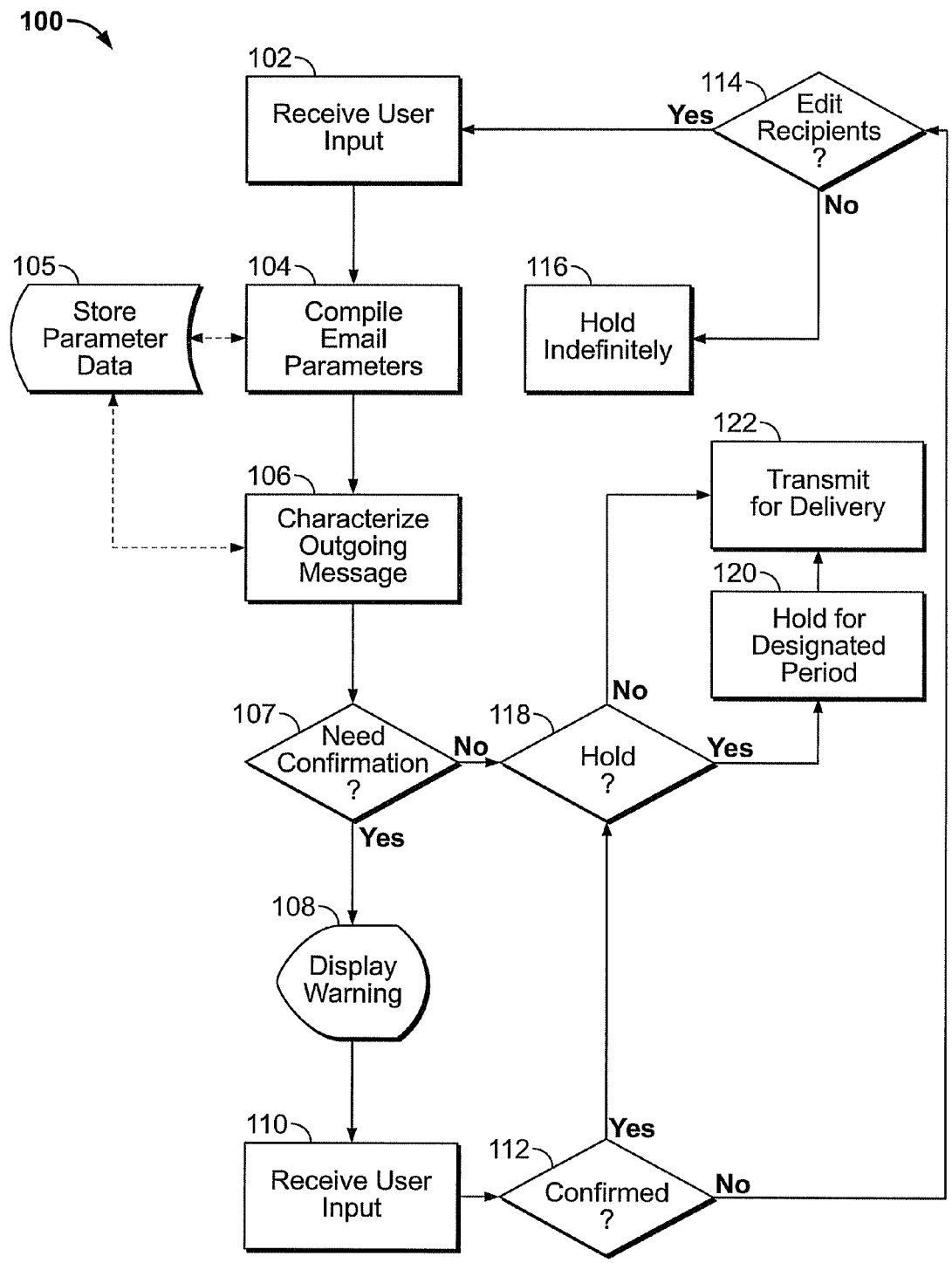
FIG. 1 is a flow diagram showing exemplary steps of a method for preventing erroneous electronic messages, such as may be performed using a suitably configured electronic messaging client.

FIG. 1 shows exemplary steps of a method 100 for preventing inadvertent addressing errors in an electronic mail client. An electronic mail or messaging client as described herein may be configured to perform method 100 by providing executable instructions encoded in a tangible computer-readable medium for use by the client. In the alternative, a messaging server may be similarly configured to perform the method, alone, or in combination with a messaging client. The executable instructions may be loaded into processor memory whenever the client's electronic mail or messaging application is operating. These executable instructions may be integrated into the mail or messaging client, causing the client to perform the described actions in addition to the customary functions of an electronic mail or messaging client.

The mail or messaging client may also be configured with instructions for predictive texting and other addressing features as known in the art. Predictive texting operates to present a list of past addressees that match text input into a addressee address field of a message editing form. The list is progressively narrowed as more characters are entered into the field. The client may be configured to permit the user to scroll down the list and select a recipient at any time. Although convenient for addressing, this feature may increase the risk of erroneous addressee selection by the user. Another automatic addressing feature that commonly leads to addressing errors is the "reply all" function, familiar to any user of electronic mail clients. Addressing errors may be caused in other ways also, and the present invention is not limited to a specific cause of addressing errors.

At 102, an electronic mail client, such as a client operating on a personal computer, PDA, mobile telephone, or the like, receives user input signaling intent to send electronic mail or message to one or more destinations. This may occur, for example, after the client has been used to prepare and address a message, which is ready for transmission. Prior to transmitting the electronic mail or message, the client processes each of the addressees designated by the electronic mail or message header to assess a risk that the addressee has been erroneously selected. In addition, or in the alternative, the client may receive user input designating addressee parameters, such as identifying one or more recipient addresses in a contact as having a "sensitive" status. The client may be configured so that confirmation is required for all recipient addressees designated as sensitive.

The client may assess risk of error in addressing using a weighted multi-factor analysis implemented by a programmed analysis algorithm. In a multifactor analysis, a numerical score may be assigned based on multiple parameters. These parameters may include, for example, the length of time since each previous addressee has been emailed, the quantity of times addressees have been sent emails together, if any, the presence of designated keywords in the message and similarity. Email parameters may be determined from past message data that is stored, maintained and updated on a local or remote database 105. The client may compile past message data 104 to develop addressee activity data that may also be stored in database 105. For example, each time a message is transmitted from the client, the client may update an activity score for each recipient addressee of the outgoing message. The activity score may provide a measure of the number of times each addressee has been a message recipient, weighted by a measure of how recent the message activity is. Higher activity scores may be assigned for more recent message activity. In addition, the compiled data may include a measure of how many non-zero times the addressee has been named as a co-addressee with other addressees in the addressee database. This co-addressee activity may also be weighted in a diminishing fashion with age (i.e., older messages receive less weight) and should include an identifier for the co-addressees for each addressee. For further example, the client may record time-of-day, date, day-of-week, and/or holiday information associated with outgoing message addressees, to develop addressee chronological data for use in risk analysis.

At 106, the client may compare the addressee parameters of an outgoing message to addressee history information stored in the database to determine a risk that the message includes an addressing error. This risk may be assessed as a numerical score, for example, as an estimated probability of error. In a multi-factor analysis, an estimated probability of error may be increased or decreased depending on multiple message parameters. Over time, error probability estimates may be refined and made more accurate using user feedback to assess a correlation between message parameter values and actual error rates. However, if such data is not available, an ad hoc estimation of error probability may also be useful, with an objective not identifying some subset of outgoing messages having a relatively high risk of addressing error in comparison to other outgoing messages from the client. Certain factors may be used to indicate a higher probability of error: (1) addressee has not been recently selected as addressee for other outgoing messages (recent activity score); (2) addressee is in general seldom selected for other outgoing messages (absolute activity score); (3) addressee has not been recently selected with other addressees on other messages (recent or time weighted inconsistent addressee grouping score); (4) addressee is in general seldom or never selected with other addressees on other messages (absolute inconsistent addressee grouping score); (5) addressee is highly similar to one or more other addressees in the database (similarity score); (6) addressee is designated as sensitive or belongs to a sensitive category (sensitivity score); (7) addressee is seldom a source for received messages (time-weighted or absolute incoming message activity score); (8) message includes one or more keywords designated as sensitive (keyword score); (9) message includes one or more keywords that are inconsistent with addressee category, for example, emotive words such as "love," "hate," "hug," etc., in a message to an addressee designated as a "customer" or "business prospect" (subject inconsistent with addressee category score), or (10) message is prepared on a day of the week or other date, or time-of-day, that is inconsistent with past patterns of mail prepared for an addressee of the message, such as a holiday message to an address that normally is mailed to only during work days. The foregoing factors are merely exemplary, and serve to illustrate various factors that may be used to develop a sophisticated estimate of a probability of error. Individual factors may be weighted and equalized to provide an overall error estimate.

In response to estimating a probability of addressing error, the client may determine 107 whether or not user confirmation is needed before the sending the electronic message, by comparing the estimated probability with a predetermined risk threshold. For example, the client may determine that user confirmation is required if the estimated probability of error exceeds some predetermined threshold, for example, 2%.

At 108, if the client determines that user confirmation is required, the client may cause a message to be displayed on a local display screen, or otherwise output to the user. User confirmation may be required, for example, if any of the addressees of an message to be sent are identified as having a relatively high probability of error. The message may identify and display to the client's user one or more reasons why a addressee is identified as questionable, and warn each the user that she may be sending a message to an unintended recipient. If none of the addressees are identified as questionable, the client may transmit the electronic mail to an outgoing mail server in a conventional fashion, without providing a warning message.

The client may, in addition, provide the user with an option to confirm that the addressees are correct in association with an outgoing message warning. For example, if the client provides an outgoing message warning in a pop-up window, the window may include one or more controls enabling the user a choice of confirming that the addressees are correctly named, or editing the electronic mail to correct the addressees. User input may therefore be received 110 in response to the warning and request for user confirmation or instructions. If the user confirms 112 that the addressees are correct notwithstanding the warning, the client may send the electronic mail to the outgoing mail server for delivery to the originally named addressees. If the user does not confirm, the client may determine by eliciting further user input whether or not the user wants to edit the message addressees or other message parameters. If the user chooses to edit the addressees, method 100 may resume again at 102 after the addressees are corrected. If the user elects to not edit the message, the message may be saved indefinitely 116, such as in a "drafts" folder, or simply deleted.

For pieces of mail that do not need confirmation or for which confirmatory user input is received, the client may determine 118 whether or not the message should be held for a defined period before mailing. For example, all messages to a designated addressee may be held for five minutes to reduce the risk of an inadvertent or premature transmission. If message parameters indicate that a piece of mail should be held, it may be held for any suitable designated period. Otherwise, the piece of mail may be transmitted for electronic mail delivery 122 in any suitable manner. Likewise, after a designated holding period expires, respective mail is transmitted for delivery 122.

Figure 2:
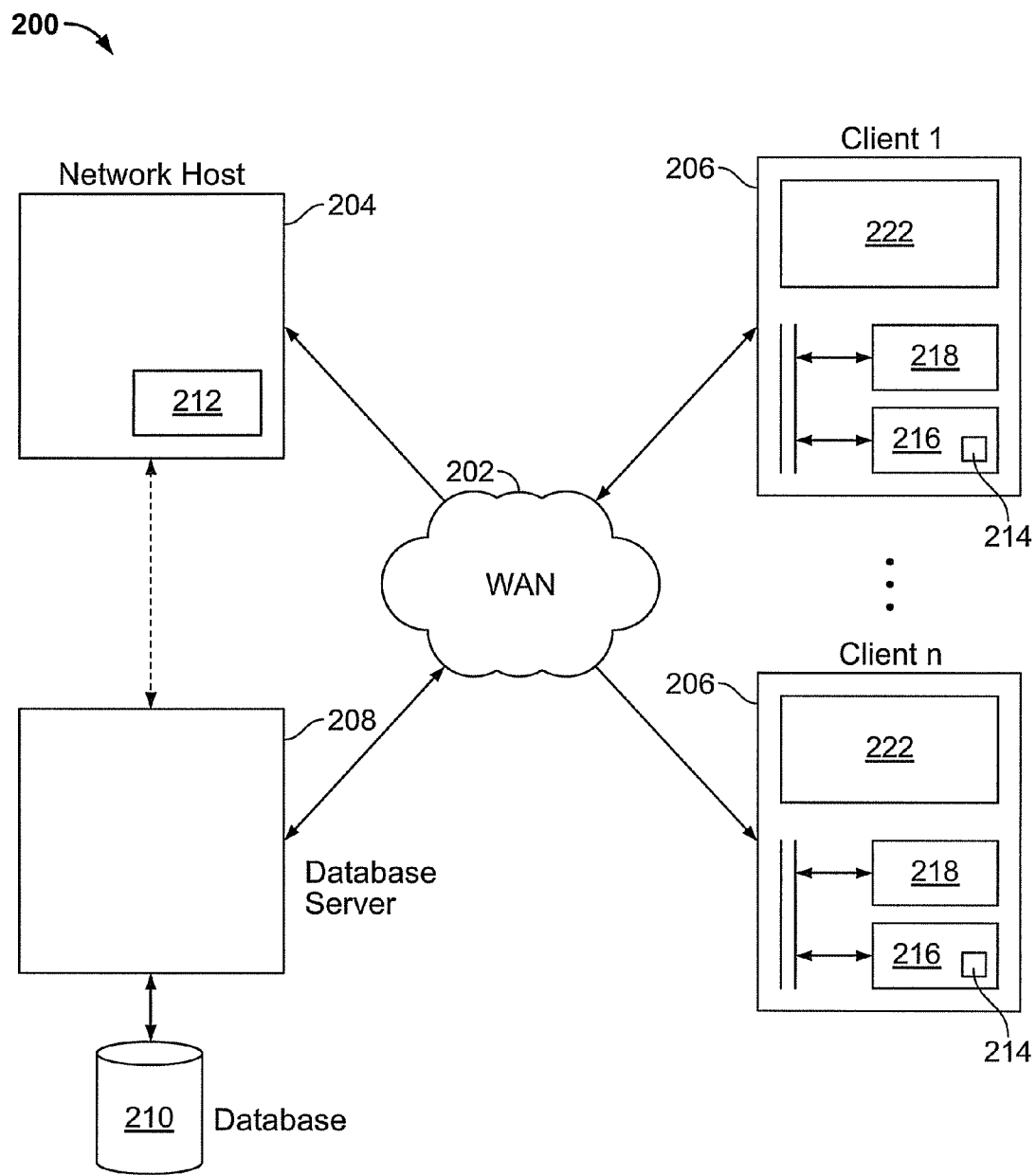
FIG. 2 is a block diagram illustrating a system for electronic messaging, including a suitably configured electronic messaging client.

FIG. 2 is a block diagram illustrating a system 200 of prevention of erroneous addressing in an electronic mail client in accordance with the present disclosure. In an aspect, the system 200 may comprise a Wide Area Network (WAN) 202, network host computer 204, multiple clients 206, a database server 208 and a database 210. The WAN may enable connectivity between the network host computer 204, the multiple clients 206, the database server 208 and the database 210. The network host computer 204 may comprise a correlation application 212, which may be encoded on computer-readable media and configured for performing steps illustrated in the flow diagram of FIG. 1. In the alternative, each of the multiple clients 206 may comprise a correlation program 214, which may also be encoded on computer-readable media and configured for performing the steps illustrated in the flowchart of FIG. 1. In yet another alternative, some of the steps illustrated in the flowchart of FIG. 1 may be performed by the correlation application 212 and some of the steps illustrated in the flowchart of FIG. 1 may be performed by the correlation program 214. The database server 208 and attached database 210 may be coupled to the network host computer 204 to store the database entries used in the method illustrated in the flowchart of FIG. 1. Alternatively, the database server 208 and/or database 210 may be connected to the WAN 202 and may be operable to be accessed by the network host computer 204 via the WAN 202.

The multiple clients 206 may each further comprise an internal hard disk 216 for storing the correlation program 214, a processor 218 for executing the correlation program 214 and/or performing other background tasks and an internal bus 220 for internally connecting the hard disk 216 and the processor 218. The hard disk 216 may also be configured to store the database entries used in the method illustrated in the flowchart of FIG. 1. The output of the method illustrated by the flowchart of FIG. 1, the message, may be displayed on the multiple clients 206 via a display 222 in accordance with the matching email parameters.

Figure 3:
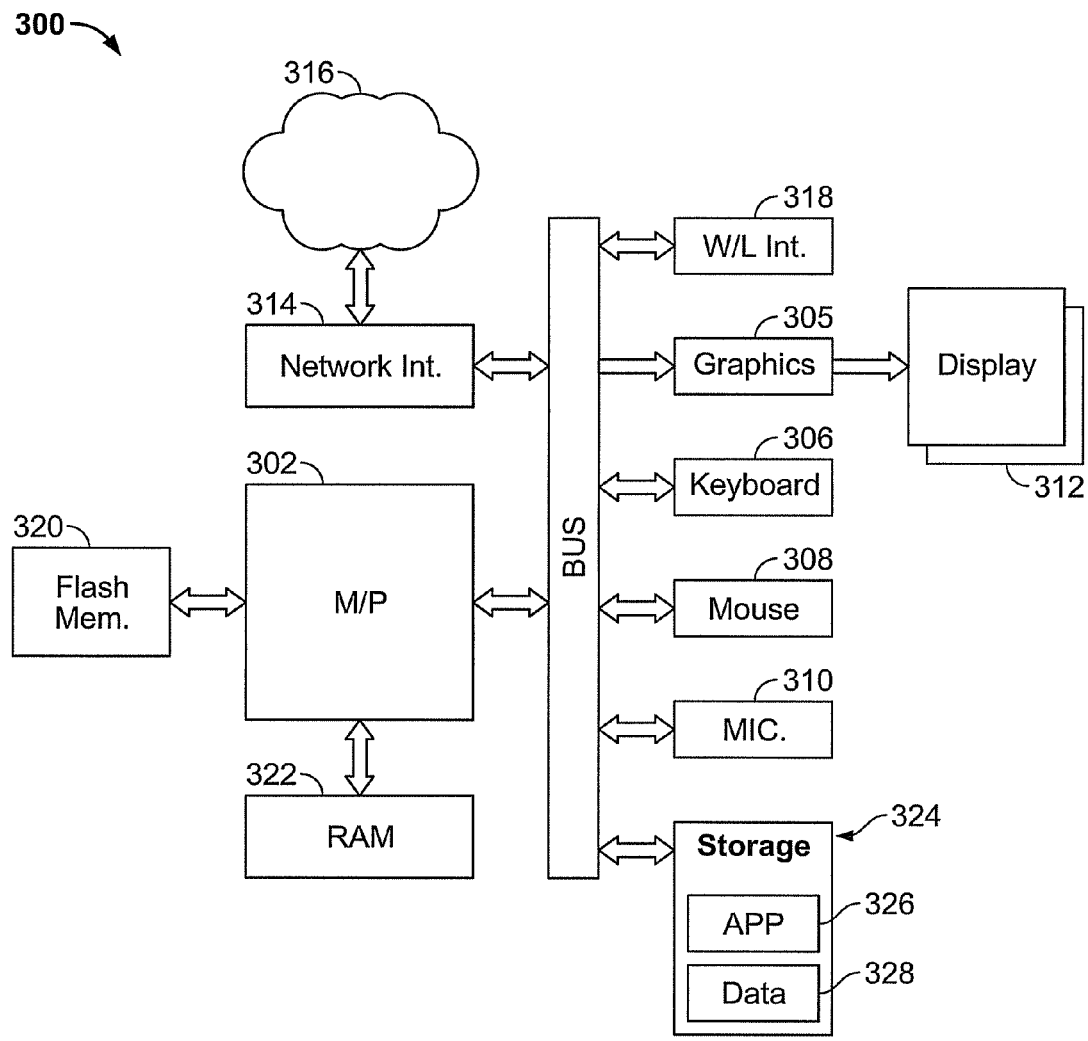
FIG. 3 is a block diagram showing components of an exemplary messaging client for preventing inadvertent addressing errors.

In some embodiments, an electronic messaging client may be configured to perform method 100 or essential portions thereof, in accordance with the understanding that messaging is a function tied to personal messaging preferences and history. The messaging client may be a remote or local client. FIG. 3 shows exemplary components of a messaging client 300, consistent with the foregoing. Client 300 may comprise a microprocessor or controller 302 coupled via a bus or other connection to certain components permitting the client to receive tangible input from a user, process the input to generate message data, and to display message data on a display device 304 via a graphics subsystem 305. User input may be received via any suitable input device, including, for example, a keyboard 306, and mouse or other pointer 308, and a microphone 310. Another increasingly prevalent input device is a touchscreen 312 that may be integrated with display 304. All of these devices function to transform physical input from the user environment into electronic input data that can be processed by microprocessor 302. At least one device of this type is essential to the operation of a messaging system and client as described herein. It should be apparent that a messaging system that is unable to receive user input would be useless.

Other essential components of the messaging client 300 may include a network interface device 314 enabling communication with external devices via a network 316. Although a wide area network is commonly used for messaging, the technology is not limited to any particular type of network. The network merely needs to provide communication between the client and at least one mail or messaging server. The client may include multiple communication devices, for example, a wireless interface 318 enabling communication to a wireless network or local wireless device, such as using cellular or Bluetooth™ technology.

Memory components are also essential to operation of the client device. A typical client may include more than one type of memory device. In the illustrated example, the client includes a flash memory device 320. Flash memory is a type of non-volatile memory that may be used to store core applications, for example, an operating system, when the client is powered off. These core applications may be automatically loaded into processor working memory, for example, random access memory 322 (RAM), when the client is powered on. Many processors also include specialized cache memory designed to facilitate accelerated processing, which may interact with RAM to handle program instructions and data. The client may further comprise a large non-volatile storage device 324, for example disk or solid-state storage comprising a computer-readable medium. Program instructions 326 may be stored on storage device 324, loaded in RAM 322 and thereby cause the client to perform a method as described herein, in response to user input. Message and other data may also be stored in the storage device 324, including but not limited to addressee pattern data for determining addressee error risk factors. Client 300 may be housed in a housing of any desired size (not shown).

Having thus described embodiments of a method and system of prevention of erroneous addressing in an electronic messaging client, it should be apparent to those skilled in the art that certain advantages of the within system have been achieved. It should also be appreciated that various modifications, adaptations, and alternative embodiments thereof may be made within the scope and spirit of the present invention. For example, a system operable over a wide area network has been illustrated, but it should be apparent that the inventive concepts described above would be equally applicable to systems operating over other networks. For further example, the present disclosure emphasizes address correction performed by a client, but the present technology may also be carried out by a messaging server, or by a server and a client working cooperatively, as discussed in connection with FIG. 2. The invention is defined by the appended claims.

The invention claimed is:

1. An apparatus comprising:
a processor;
a memory in communication with the processor, the memory holding executable instructions that, when executed by the processor, cause the processor to:
generate valid addressees to electronic messages, in response to input by a user of an input device;
in response to transmissions of outgoing electronic messages having valid addressees, record the valid addressees and associated chronological message data;
determine a numerical risk that at least one of first valid addressees of a first outgoing electronic message containing at least two addressees authored by the user is unintended, based at least in part on (i) whether or not a keyword in the first outgoing electronic message is designated as sensitive or is inconsistent with a category assigned to the at least one of the first valid addressees, and (ii) on first associated chronological message data;
if the numerical risk exceeds a predetermined threshold, then for one or more combinations of the at least two addressees, query a database to determine a time period T representing the amount of time between when a past message was last sent from the user to the one or more combinations of the at least two addressees and the present;
determine whether T exceeds a predetermined amount of time; and
in response to determining that T exceeds the predetermined amount of time, delay transmission of the first outgoing electronic message to permit review of the at least two addressees by the user.

2. The apparatus of claim 1, wherein the instructions further cause the processor to generate a confirmation message, in response to determining that T exceeds the predetermined amount of time.

3. The apparatus of claim 1, wherein the instructions further cause to the processor to suggest at least one alternative addressee in response to determining that T exceeds the predetermined amount of time.

4. The apparatus of claim 1, wherein the instructions further cause the processor to delay transmission of the first outgoing electronic message until input is received from the user of the input device indicating confirmation of the at least one of the first valid addressees.

5. The apparatus of claim 1, wherein the instructions further cause the processor to query the database to determine a frequency with which the user of the input device has sent electronic messages addressed to both of the at least two addressees, and generating a confirmation message if the frequency does not exceed a predetermined frequency.

6. The apparatus of claim 1, wherein the instructions further cause the processor to delay transmission of the first outgoing electronic message based on a weighted multi-factor analysis.

7. The apparatus of claim 6, wherein the multi-factor analysis is implemented by a programmed analysis algorithm.

8. The apparatus of claim 6, wherein the multi-factor analysis is based upon two or more of: the length of time since each of the at least two addressees has been emailed; the quantity of times each of the at least two addressees have been addressees on the same electronic mail; the similarity of one or more of the at least two addressees to other addressees in the database; and the presence of designated keywords in the message.

9. The apparatus of claim 1, wherein the executable instructions further cause the processor to update an activity score for each of the at least two addressees of the first outgoing electronic message after the message is sent.

10. The apparatus of claim 9, wherein the activity score is a measure of the number of times each of the at least two addressees has been in an outgoing message.

11. The apparatus of claim 9, wherein the activity score is weighted by a measure of how recent each of the at least two addressees has been included in an outgoing message.

12. The apparatus of claim 9, wherein the activity score comprises a measure of how many times one or more of the at least two addressees has been co-addressed with another one of the at least two addressees.

13. The apparatus of claim 12, wherein the activity score is weighted inversely with an age of the co-addressed addressee.

* * * * *